United States Patent [19]
Levionnais

[11] Patent Number: 5,734,333
[45] Date of Patent: Mar. 31, 1998

[54] DEVICE WITH SPECTRAL PURITY FOR THE REMOTE EXCHANGE OF INFORMATION BETWEEN A PORTABLE OBJECT AND A STATION

[75] Inventor: Philippe Levionnais, Caen, France

[73] Assignees: France Telecom, Paris; La Poste, Boulogne Billancourt, both of France

[21] Appl. No.: 729,826

[22] Filed: Oct. 8, 1996

Related U.S. Application Data

[63] Continuation of Ser. No. 324,566, Oct. 18, 1994, abandoned.

[30] Foreign Application Priority Data

Oct. 18, 1993 [FR] France .................. 93 12375

[51] Int. Cl.[6] ............................................ G06K 7/08
[52] U.S. Cl. .......................... 340/825.7; 340/825.54; 340/572; 340/825.31; 235/449
[58] Field of Search .................... 340/825.54, 825.7, 340/541, 545, 572, 825.31, 870.31; 235/449

[56] References Cited

U.S. PATENT DOCUMENTS

| | | | |
|---|---|---|---|
| 4,556,883 | 12/1985 | Strietzel | 340/825.54 |
| 4,656,472 | 4/1987 | Walton . | |
| 4,691,202 | 9/1987 | Denne et al. | 340/825.34 X |
| 4,928,087 | 5/1990 | Kreft et al. | 340/825.54 X |
| 5,028,918 | 7/1991 | Giles et al. | 340/825.54 |
| 5,051,726 | 9/1991 | Copeland et al. | 340/572 |
| 5,083,013 | 1/1992 | Levionnais | 235/449 |
| 5,095,309 | 3/1992 | Troyk et al. | 340/825.54 |
| 5,189,397 | 2/1993 | Watkins et al. | 340/572 |
| 5,235,326 | 8/1993 | Beigel et al. | 340/825.54 |
| 5,239,696 | 8/1993 | Balch et al. | 340/572 |
| 5,276,430 | 1/1994 | Granovsky | 340/572 |
| 5,293,399 | 3/1994 | Hefti | 340/825.54 |
| 5,349,339 | 9/1994 | Kind | 340/572 |
| 5,387,900 | 2/1995 | Plonsky et al. | 340/572 |
| 5,440,302 | 8/1995 | Irmer et al. | 340/825.54 X |

FOREIGN PATENT DOCUMENTS

| | | | |
|---|---|---|---|
| 0245196 | 11/1987 | European Pat. Off. . | |
| 0257688 | 3/1988 | European Pat. Off. . | |
| 2640830 | 6/1990 | France . | |
| 5-174221 A | 7/1993 | Japan | 340/825.31 |
| 8700584 | 10/1987 | WIPO . | |

*Primary Examiner*—Michael Horabik
*Assistant Examiner*—William H. Wilson, Jr.
*Attorney, Agent, or Firm*—Anderson, Kill & Olick, P.C.

[57] ABSTRACT

A system for remote information exchange between a portable object and a station and in which in order to minimize an undesirable profitless cluttering in the radio frequency environment of the system, the phase variation between the first and second alternating voltages (VEX and VEY), which is induced by the switchings of the electronic circuit of the portable object as a function of information to be transmitted to the station, enables the station-processing means (SPM) to deduce the information therefrom, and the elements of the electronic circuit and of the station are chosen and configured so that the phase variation induce by the inductive coupling is greater than a predetermined threshold.

13 Claims, 7 Drawing Sheets

DEVICE WITH SPECTRAL PURITY FOR THE REMOTE EXCHANGE OF INFORMATION BETWEEN A PORTABLE OBJECT AND A STATION

This is a continuation of application Ser. No. 08/324,566 filed Oct. 18, 1994, now abandoned.

BACKGROUND OF THE INVENTION

The invention relates to the remote exchange of information between a portable object and a station.

It applies particularly but not limitingly to the exchange of information between an electronic memory card, commonly called a "chip card", and a terminal.

In the document FR-A-2 640 830 corresponding to U.S. Pat. No. 5,083,013, there is described a device for the remote exchange of information between a portable object and a station.

The device comprises:

on the station,

- an oscillator including a feedback loop, possessing a station-inductive element, and capable of imparting thereto a working frequency which is variable relative to a rest frequency, as well as
- station-processing means connected to the oscillator and capable of processing the variations in the working frequency, on the portable object,

- an electronic circuit switchable between an inactive state and an active state in which it forms a resonant circuit tuned to a frequency differing from said rest frequency, whilst remaining suitable for inductive coupling with the feedback loop at said rest frequency, and
- object-processing means capable of switching the electronic circuit as a function of information to be transmitted to the station.

In this device, the variation in the working frequency of the oscillator induced by the switchings of the electronic circuit of the portable object enables the station-processing means to deduce therefrom the information transmitted between said portable object and the station.

Now, the free oscillator of such a device causes the frequency which it generates to waver, and this inevitably produces the emission of non-essential radiation more commonly called harmonics.

This results in the radio frequency environment of the device being profitlessly cluttered, and this may upset the proper operation of data transmission of other radio frequency devices located nearby.

Accordingly, the main object of the invention is preventing a profitless cluttering in the radio frequency environment of the device or circuit for remote exchange of information.

SUMMARY OF THE INVENTION

This and other objects of the invention are achieved by providing an electronic information detection circuit which comprises:

on the station,

- an alternating voltage generator able to deliver a first chosen voltage,
- a station-resistive element possessing a first lug connected to the voltage generator and a second lug,
- a series arrangement connected to the second lug and possessing a station-inductive element and a station-capacitive element, said arrangement being capable of producing a second alternating voltage, the phase difference between the first and second alternating voltages being variable,
- station-processing means connected to the first and second lugs and capable of processing the phase variation between the first and second voltages, on the portable object,

- an electronic circuit switchable between an inactive state and an active state in which it forms a resonant circuit with the station-inductive element and induces in the latter an additional resistive term,
- object-processing means capable of switching the electronic circuit as a function of information to be transmitted to the station.

The phase variation between the first and second voltages which is thus induced by these switchings enabling the station-processing means to deduce said information therefrom.

Such a device has the advantage of imparting spectral purity, insofar as it allows the use of a voltage generator which is as pure as is desired.

According to a preferred embodiment of the invention, the station-processing means comprise:

- a first matching circuit able to convert the first alternating voltage into a first square signal,
- a second matching circuit able to convert the second alternating voltage into a second square signal; and
- a logic assembly possessing a first input connected to the output of the first matching circuit, a second input connected to the output of the second matching circuit, and an output able to deliver the binary information induced by the phase variations between the first and second alternating voltages thus converted.

Preferably, each matching circuit comprises a non-inverting operational amplifier and a trigger circuit connected to said operational amplifier.

Advantageously, the station-processing means furthermore comprise phase amplifying means able to amplify the phase variation between the first and second alternating voltages before it is processed.

According to a first embodiment, the phase amplifying means follow a trigonometric law.

According to a second embodiment, the phase amplifying means follow a spectral law.

The present invention also relates to an installation comprising a plurality of devices for remote exchange of information, the stations of which are placed substantially next to one another.

BRIEF DESCRIPTION OF THE DRAWINGS

Other characteristics and advantages of the invention emerge in the light of the detailed description hereafter and of the appended drawings in which.

DETAILED DESCRIPTION OF THE PREFERRED EMBODIMENTS

The drawings include in essence elements of definite character. In this respect they form an integral part of the description and may not only serve better to elucidate the description below, but also to contribute, as the case may be, to the definition of the invention.

Figure 1:
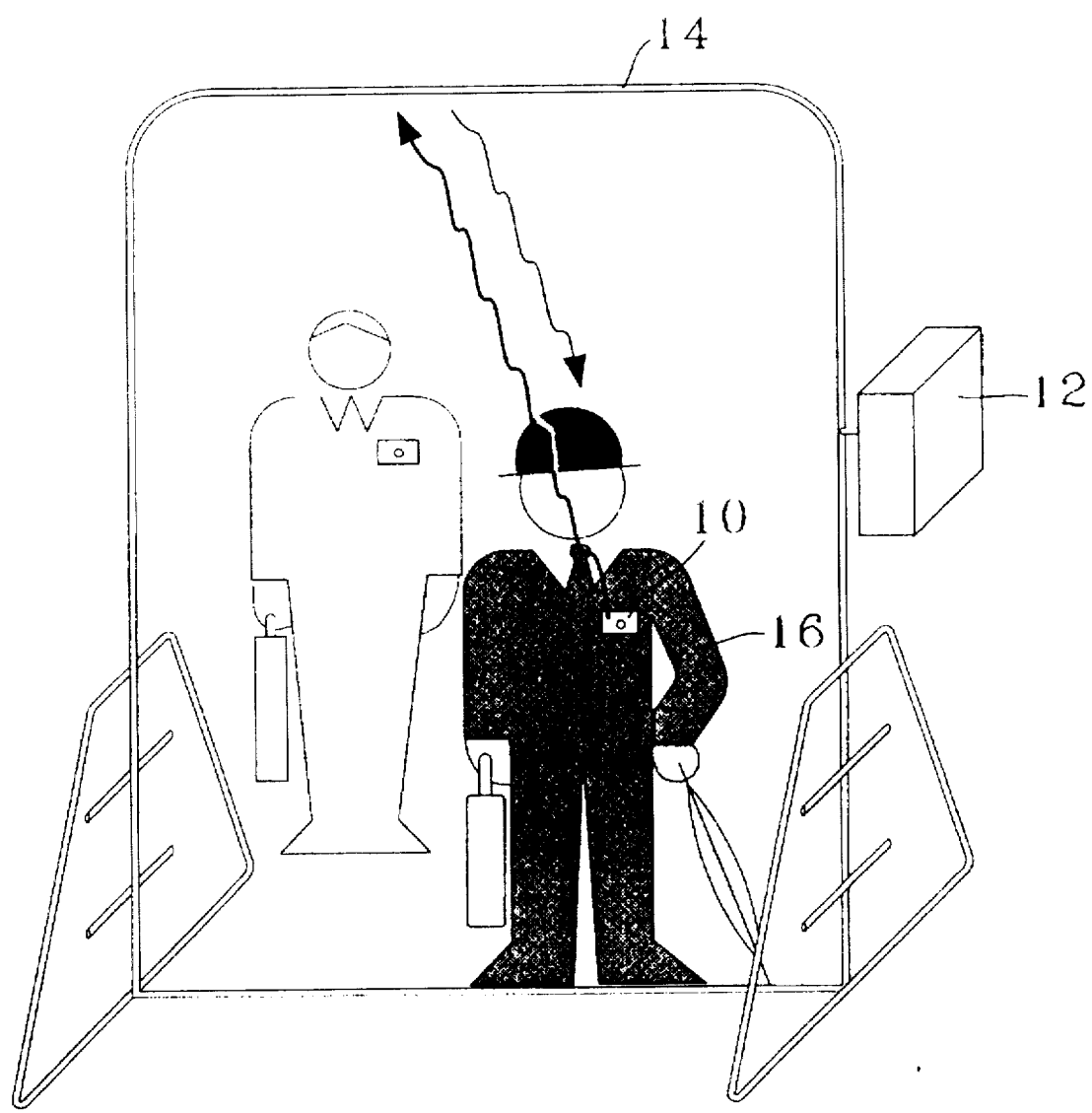
FIG. 1 represents diagrammatically an information exchange device associated with access control according to the prior art.

According to FIG. 1, in a particular application of the invention, in no way limiting, the portable object 10 is of the memory card type, and the station is a terminal 12 equipped with an inductive portal 14 through which can pass a person 16 in possession of the memory card 10.

In U.S. Pat. No. 5,083,013 mentioned above and incorporated herein by reference thereto, the variation in frequency of the signal produced by the oscillator is used for the transmission of information from the portable object to the station.

In the present invention, the terminal is modified in its structure, as will be described in greater detail below, whilst the card exhibits the same elements and performs the same functions in the terminal-to-station direction of data transmission as in U.S. Pat. No. 5,083,013.

Figure 2:
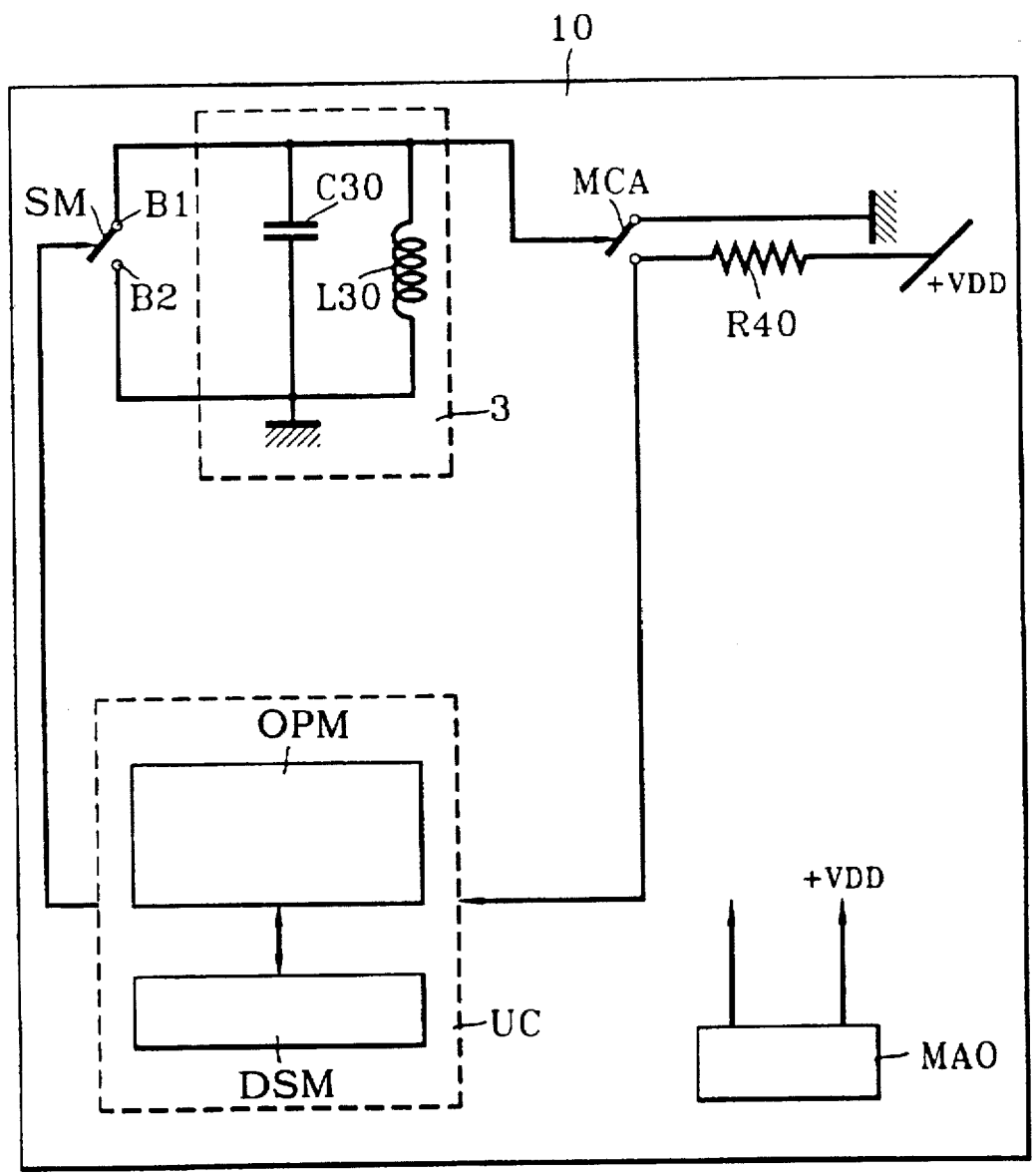
FIG. 2 represents diagrammatically the elements constituting a chip card according to the prior art.

Thus, in accordance with FIG. 2, the card 10 is of the standard memory card type, that is to say of a size of around 85 mm×55 mm. It includes an electronic circuit 3 possessing an object-inductive element L30 having an inductive value substantially equal to 6 µH and an intrinsic resistive value R30 substantially equal to 6.3 ohms.

This inductive element L30 is intended to be placed into inductive coupling with the inductive element of the terminal (which will be described in greater detail below) when the carrier of the card passes through the portal.

Across the lugs of this inductive element L30 is placed an object-capacitive element C30 whose capacitive value is chosen so as to form with this inductive element L30 a resonant circuit with the inductive element of the station.

The electronic circuit 3 is switchable between two states by way of switching means SM, represented here diagrammatically by a breaker, capable of short-circuiting the two lugs B1 and B2 of the capacitive element C30 (or of the inductive element L30). Thus, an active state is defined in which, the breaker SM being open, the electronic circuit 3 forms a resonant circuit with the terminal, and in the inactive state in which, the breaker SM being closed, the respective lugs of the capacitive element C30 and inductive element L30 are short-circuited and earthed.

The switching means SM are controlled by object-processing means OPM connected to information storage means DSM. These means OPM and DSM form part of the central processing unit which, in the particular case of a memory card, comprises the microcontroller of this card as well as its implicitly associated memories.

An input of the object-processing means OPM is capable of being connected either to ground, or to a predetermined voltage +VDD delivered by object-supply means OSM. The choice of this link depends on additional switching means ASM controlled by the resonant circuit of the card 10, that is to say the electronic circuit 3 in its active state.

Those skilled in the art will refer to the document mentioned above for more detailed teachings regarding the components of a chip card, whilst bearing in mind that the present invention is distinguished from this document by the fact that the use of the physical phenomenon between the card and the terminal is modified at the level of the said terminal, whilst the terminal-to-card communication protocol is identical to that of the said document.

Figure 3:
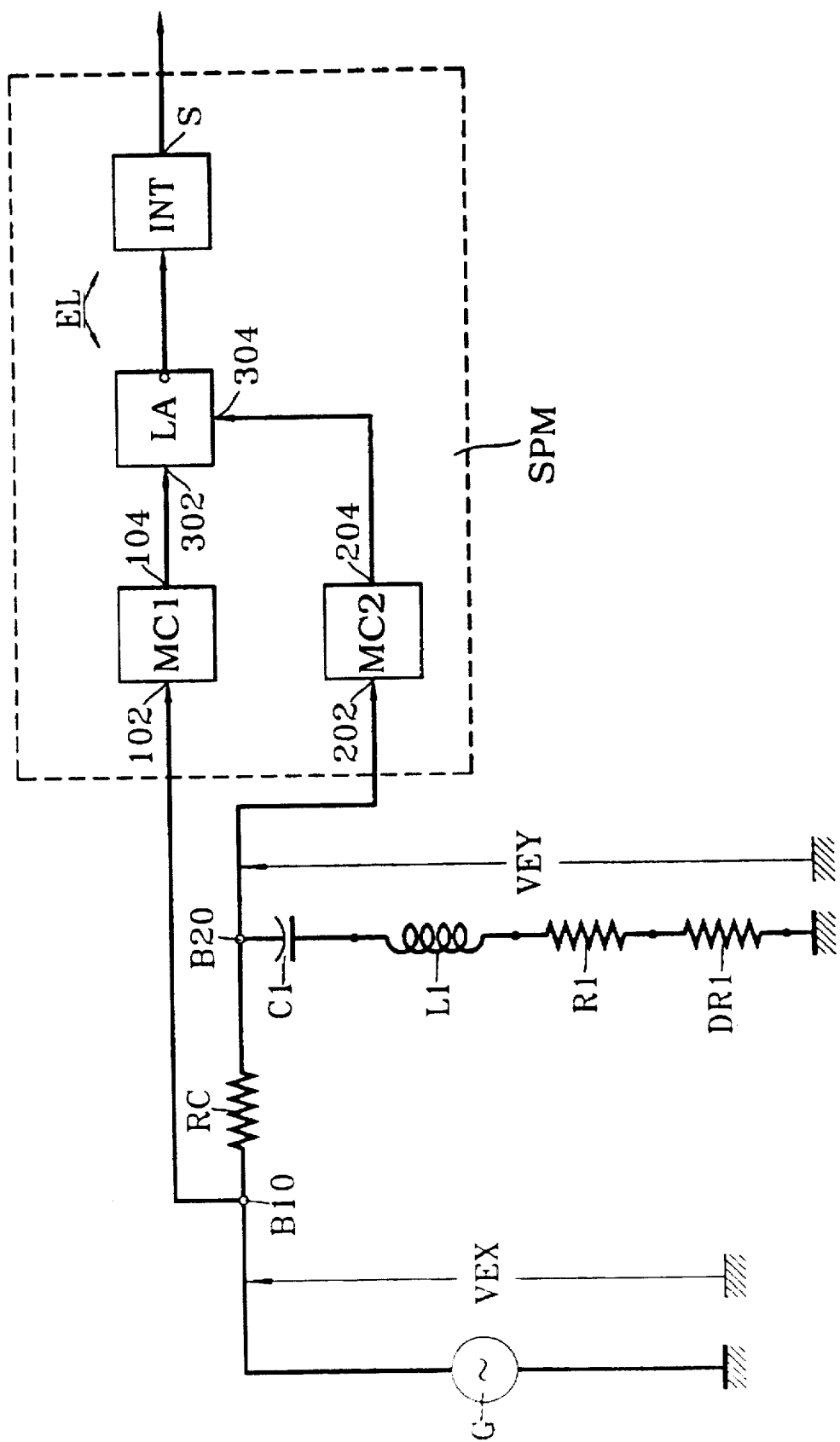
FIG. 3 is a diagrammatic representation of the elements constituting a station according to the invention.

With reference to FIG. 3, the terminal 12 according to the invention comprises an alternating voltage generator G able to deliver a first chosen voltage VEX.

For example, the generator G delivers a fixed and stable alternating voltage with a value substantially equal to 2 V r.m.s. at the frequency of 6.78 MHz, for example.

The lug B10 of a resistor RC is connected to the generator G.

A series arrangement is connected to the second lug B20 of the resistor RC.

This series arrangement comprises the station-inductive element L1 mentioned above and a station-capacitive element C1. For example, the inductive value of the inductive element L1 is of the order of 5 µB. The capacitor C1 has a value of the order of 100 pico F. The resistor RC has a value substantially equal to 50 ohms.

It should be noted that the inductive element L1 is formed by the portal to the interior of which can pass the person in possession of his card. This inductive element constitutes a rectangular loop, one lug of which is connected to the capacitive element C1 and the other lug of which is connected to ground. The dimensions of the inductive frame L1 are those of a standard door, that is to say around 2 m in height and 80 cm in width. It should be noted that the inductive value of L1 is supplemented with an intrinsic resistive value R1 substantially equal to 4 ohms.

The arrangement C1, L1 and R1 is able to produce, at the generator G, a second alternating voltage VEY, the phase difference between the first and second voltages being variable. For example, the second voltage VEY has a value substantially equal to 1.9 V r.m.s.

When the electronic circuit 3 of the memory card is in its active state, the resistive value R1 of the station-inductive element L1 is increased by the quantity DR1 given by a formula $$DR = \frac{M^2 \cdot W^2}{R30}, \text{ where}$$

M—mutual induction between L1 and L30,

W—frequency of the generator,

R30—intrinsic resistance of L30.

Preferably, the ratio of the value of the additional resistive term DR1 to the resistive value R1 of the station-inductive element L1 is greater than a chosen value. For example, the numerical value of the additional resistive term DR1 is of the order of 0.18 ohms, with M being equal $2.5.10^8$H, W being equal 6.78 MHZ, and R30 being equal 6.30 hm.

The choice of the capacitive and resistive values of the elements C1 and RC will contribute to obtaining a significant variation in the phase between the voltages VEX and VEY when the frame L1 is in inductive coupling with the memory card.

The information to be transmitted from the card to the terminal is stored in the storage means DSM in the form of 0 or 1 binary data. During transmission of such information, the object-processing means OPM put the electronic circuit 3 into its active or non-active state depending on the value of the binary datum. The phase difference D$\phi$ (FIGS. 4D, 4E) between the voltages VEX and VEY therefore passes from a first value $\phi$1 (FIG. 4B) to a second value $\phi$2 (FIG. 4D) and vice versa depending on the binary datum transmitted. The station-processing means SPM analyze these different variations and deduce therefrom the information transmitted.

In order to analyze these variations, the station-processing means SPM comprise:
 a first matching circuit MC1 able to convert the first alternating voltage VEX into a first square signal VTTLX (FIG. 4A) and possessing a first input 102 connected to the first lug B10 and an output 104;
 a second matching circuit MC2 able to convert the second alternating voltage VEY into a second square signal VTTLY (FIGS. 4B and 4D) and possessing a first input 202 connected to the second lug B20 and an output 204.

The station-processing means SPM are supplemented with a logic assembly LA possessing a first input 302 connected to the output 104 of the first matching circuit MC1, a second input 304 connected to the output 204 of the second matching circuit MC2, and an output S able to deliver the binary information induced by the phase variations between the first and second alternating voltages thus converted.

For example, the logic assembly LA comprises a D-type flip-flop whose first input 302 is a clock input and whose second input 304 is a clear input.

Finally, the processing means SPM comprise integration means INT connected to the output of the D flip-flop so as to deliver variations, induced by the binary information emitted by the card, in the mean value of the signal.

Advantageously, each matching circuit MC1 and MC2 comprises a non-inverting operational amplifying circuit able to suppress the stray phase variations caused, as the case may be, by the inductive environment of the terminal.

Figure 5:
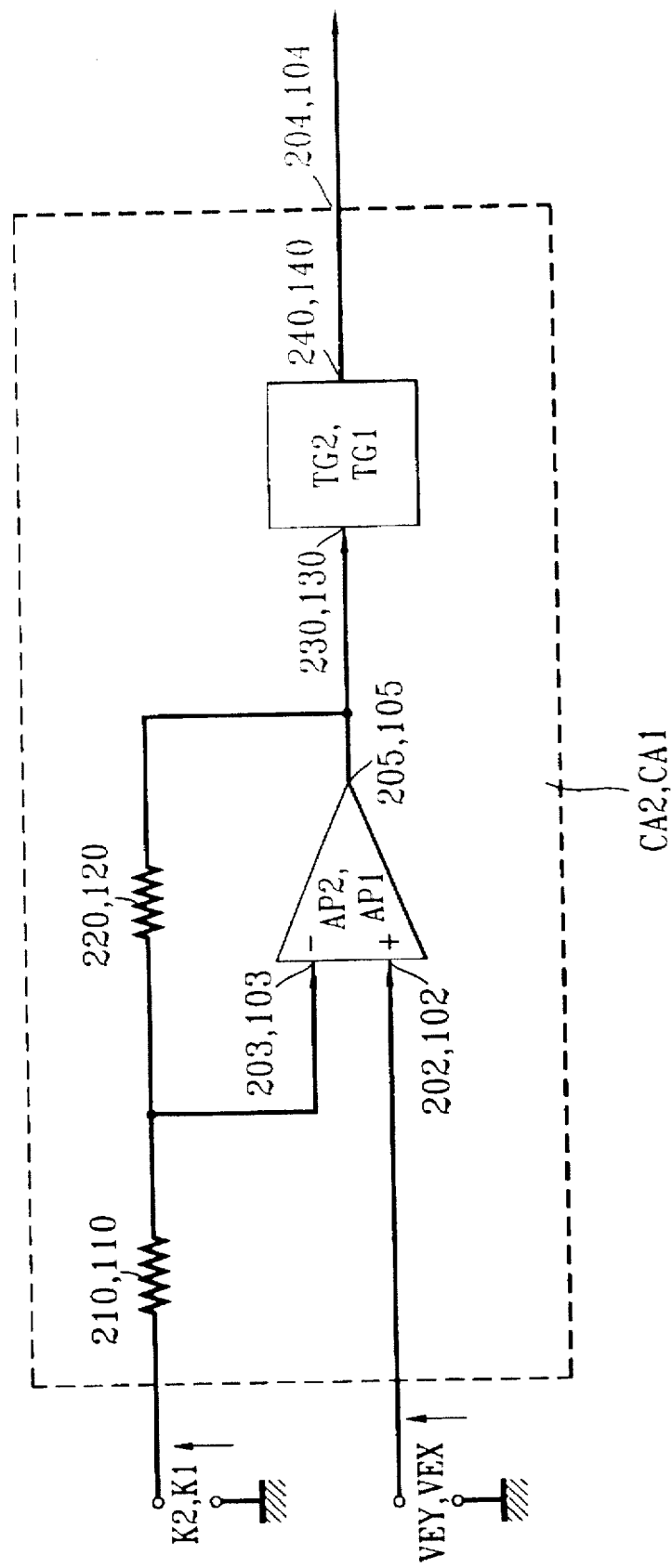
FIG. 5 is a detailed diagram of the matching means according to the invention.

With reference to FIG. 5, there are represented the matching means MC2 or MC1.

They each comprise an operational amplifier AP2 or AP1 which are able to amplify the voltages VEY or VEX and possess a first input 202 or 102 connected to the lug B20 or B10, a second input 203 or 103 receiving a reference voltage K2 or K1 across a resistor 210 or 110 and an output 205 or 105. The output 205 or 105 of the operational amplifier AP2 or AP1 is connected to a switching circuit TG2 or TG1, for example a Schmitt trigger, possessing an input 230 or 130 connected to the output 205 or 105 of the amplifier AP2 or AP1 and an output 240 or 140 able to deliver a trigger signal. The switching circuit TG2 or TG1 is connected to the integration means INT which deliver the binary flow of information.

The non-inverting setup makes it possible here to circumvent the small variations in phase which may occur at the level of the terminal. Indeed, the non-inverting amplifier shifts the amplified output signal by a voltage corresponding to the reference voltage K2 or K1 applied to the inverting input 203 or 103.

To do this, a reference voltage K2 or K1 must be chosen which is equal to the trigger voltage of the switching element TG2 or TG1.

For example, the reference voltage K2 has a value substantially equal to 1.7 V.

For example, the switching element TG1 or TG2 of Schmitt trigger type is the one sold under reference 74ACT74.

The resistor 210 or 110 has a value of 649 ohms.

Furthermore, a resistor 220 or 120 is provided between the inverting input 203 or 103 and the output 205 or 105. It has a value of 649 ohms for the circuit MC2 and 866 ohms for the circuit MC1.

Reference is now made to FIGS. 4A to 4F which are timing charts illustrating the operation of the device according to the invention.

Figure 4A:
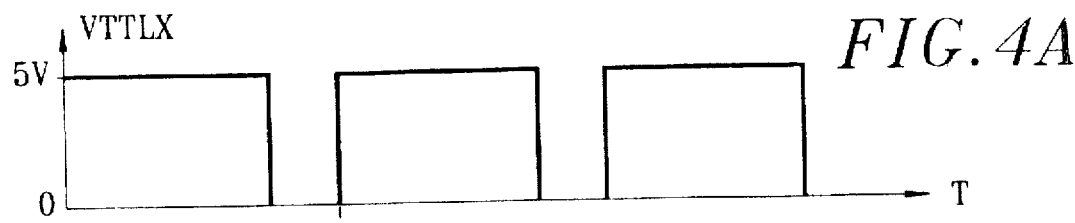
FIGS. 4A–4F represent timing charts illustrating diagrammatically the operation of the device station side according to the invention.

In FIG. 4A is represented the square signal VTTLX arising from the first matching circuit MC1.

This is a square signal of 5 V in the high state and 0 V in the low state insofar as the matching circuit is TTL engineered. This signal VTTLX is a digital representation of the alternating signal VEX.

Figure 4B:
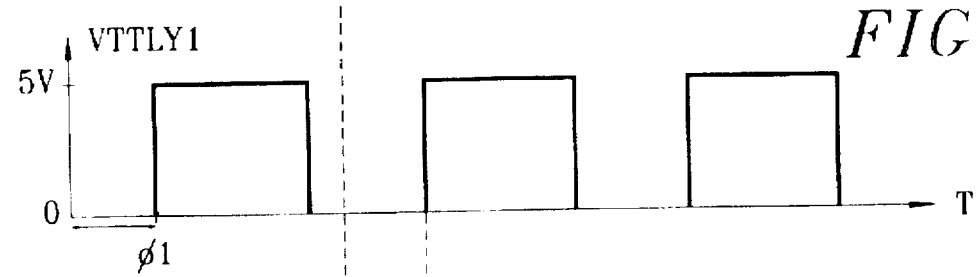

In FIG. 4B is represented the square signal VTTLY1 arising from the second matching circuit MC2 in the absence of inductive coupling between the terminal and the card. This is a square signal of 5 V in the high state and 0 V in the low state, TTL engineered.

This signal VTTLX is a digital representation of the alternating signal VEY in the absence of inductive coupling between the card and the terminal.

The phase difference $\phi$1 between VTTLX and VTTLY is represented on the time axis T of the abscissae.

Figure 4C:
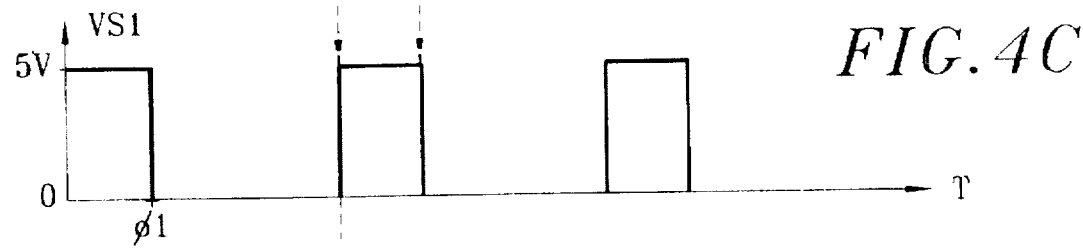

In FIG. 4C is represented the square signal TS1 arising from the D flip-flop when the signals VTTLX and VTTLY1 are respectively applied to the first and to the second inputs of the D flip-flop.

The rising edge of the signal VS1 is determined by the rising edge of the signal VTTLX, and the falling edge of the signal VS1 is determined by the falling edge of the signal VTTLY1.

Figure 4D:
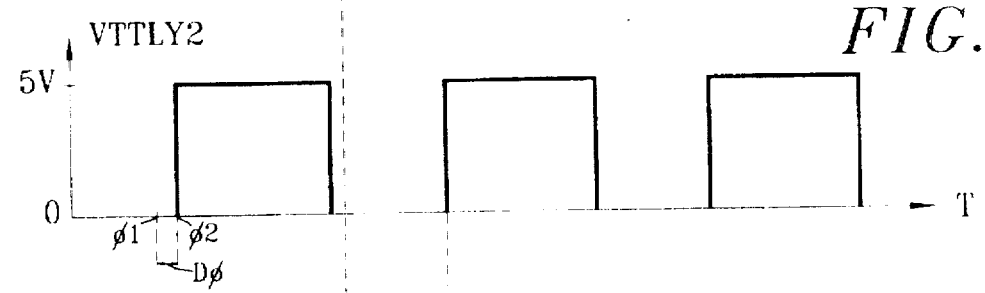

In FIG. 4D is represented the square signal VTTLY2 arising from the second matching circuit MC2 in the presence of inductive coupling between the terminal and the card.

As in FIG. 4B this is a square signal of 5 V in the high state and 0 V in the low state.

This signal VTTLY2 is a digital representation of the alternating signal in the presence of inductive coupling between the terminal and the card.

The phase difference $\phi$2 between VTTLX and VTTLY is here represented on the time axis T.

Given the inductive coupling between the card and the terminal, the phase $\phi$2 of the signal VTTLY2 is different from the phase $\phi$1 of the signal VTTLY1.

It is this difference between $\phi$2 and $\phi$1, hereafter called D$\phi$, which makes it possible to deduce the information transmitted from the card to the terminal. For example, the value D$\phi$ is of the order of 0.5°.

Figure 4E:
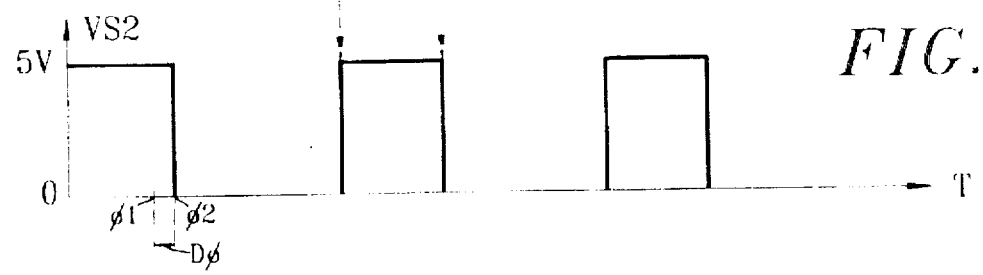

In FIG. 4E is represented the square signal VS2 arising from the D flip-flop when the signals VTTLX and VTTLY2 are respectively applied to the first and second inputs of the D flip-flop.

The rising edge of the signal VS2 is determined by the rising edge of the signal VTTLX, and the falling edge of the signal VS2 is determined by the rising edge of the signal VTTLY2.

Figure 4F:
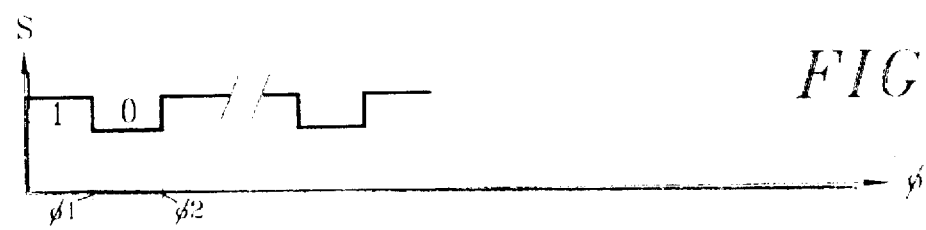

In FIG. 4F is represented the signal S arising from the integrator means INT.

The signal S represents the information transmitted by the card to the terminal and which is obtained in this way by the processing means SPM.

As regards the transmission of information in the terminal-to-card direction, this is carried out simply by applying or not applying a voltage to the lugs of the object-inductive element L30, as indicated in the U.S. Pat. No. 5,083,013.

As described above, the phase variation, or more exactly the variation in the phase difference between the alternating voltages VEX and VEY, which are induced by the data to be transmitted from the portable object to the station, enables the station-processing means to deduce therefrom the information thus transmitted.

However, in certain cases, especially the use of a station having a frame antenna (portal) of large dimensions, or special uses, for example when the portable object is inclined with respect to the portal, or else when the portable object is near a metallic object, the phase variation between the alternating voltages may become small and consequently give a signal-to-noise ratio which is difficult to utilize.

It is also the object of the present invention to afford a solution to this problem.

This result is achieved by station-processing means which furthermore comprise phase amplifying means able to amplify the phase variation between the first and second voltages before it is processed.

According to a first embodiment, the phase amplifying means follow a trigonometric law.

In a second embodiment, the phase amplifying means follow a spectral law.

Figure 6:
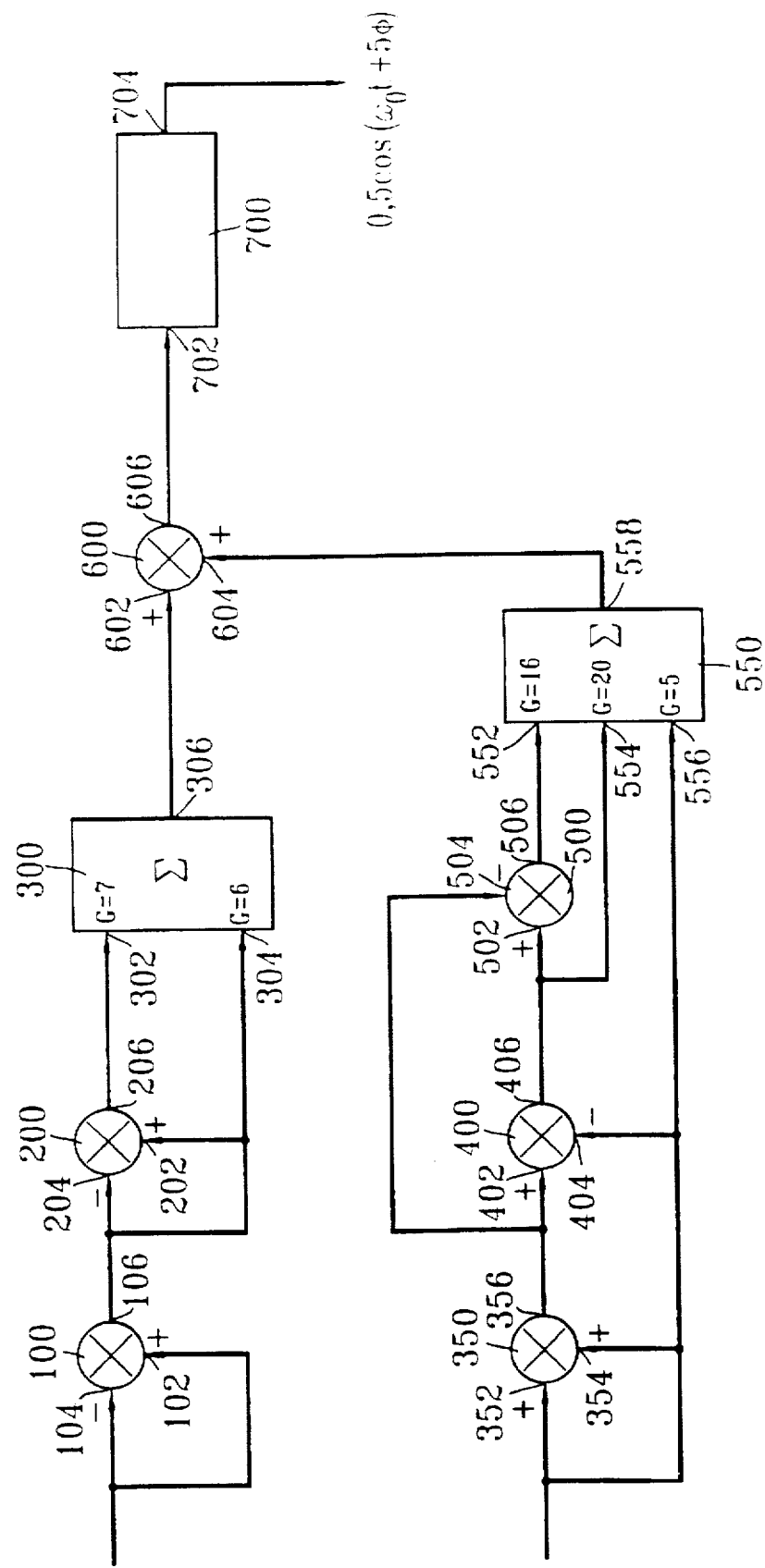
FIG. 6 represents diagrammatically the essential elements constituting the phase amplifying means with trigonometric law according to the invention.

In FIG. 6 are represented the phase amplifying means following the trigonometric law.

In this embodiment, the voltages VEX and VEY are respectively equal to $\cos(\omega_0 t)$ and $\cos(\omega_0 t + \phi)$. The parameter $\phi$ here represents the phase difference between these two voltages at time $t=0$.

According to the invention, at the end of processing the phase amplifying means deliver an output value equal to $\cos(\omega_0 t + n\phi)$ where n is a positive integer starting from an input value equal to $\cos(\omega_0 t + \phi)$. To simplify the description, the second term $n\phi$ of the phase expression $\omega_0 t + n\phi$ will be called the phase amplification hereafter.

With reference to FIG. 6, at the end of the amplifying chain, the time-origin phase of the output signal is multiplied by n=5. Of course, other values n may be suitable.

More precisely, the phase amplifying means here comprise:

a first multiplier 100 possessing a positive input 102 connected to the first lug B10 so as to receive the alternating voltage VEX corresponding to the signal $\cos(\omega_0 t)$, a negative input 104 connected to the first lug B10 and an output 106 delivering the signal—$\cos^2(\omega_0 t)$;

a second multiplier 200 possessing a positive input 202 connected to the output 106 of the first multiplier 100, a negative input 204 connected to the output 106 of the first multiplier 100 and an output 206 delivering the signal $\cos^4(\omega_0 t)$;

a first adder 300 possessing a first input 302, having a chosen gain G=7, connected to the output 206 of the second multiplier 200, a second input 304, having a chosen gain G=6, connected to the output 106 of the first multiplier 100 and an output 306 able to deliver a signal representing a multiple n−1 of the pulsatance $\omega_0$ of the first alternating voltage VEX (here $\cos(4\omega_0 t)$ with n−1=4);

a third multiplier 350 possessing a first positive input 352 connected to the second lug B20 so as to receive the second alternating voltage VEY corresponding to the signal $\cos(\omega_0 t + \phi)$, a second positive input 354 connected to the second lug B20 and an output 356 delivering the signal $\cos^2(\omega_0 t + \phi)$;

a fourth multiplier 400 possessing a positive input 402 connected to the output 356 of the third multiplier 350, a negative input 404 connected to the second lug B20, and an output 406 delivering the signal—$\cos^3(\omega_0 t + \phi)$;

a fifth multiplier 500 possessing a positive input 502 connected to the output 406 of the fourth multiplier 400, a negative input 504 connected to the output 356 of the third multiplier 350 and an output 506 delivering the signal $\cos^5(\omega_0 t + \phi)$;

a second adder 550 possessing a first input 552, having a chosen gain G=16, connected to the output 506 of the fifth multiplier 500, a second input 554, having a chosen gain G=20, connected to the output 406 of the fourth multiplier 400, a third input 556, having a chosen gain G=5, connected to the second lug B20 and an output 558 able to deliver a signal representing a multiple n of the pulsatance of the second alternating voltage VEY (here $\cos(5\omega_0 t + 5\phi)$ with n=5);

a sixth multiplier 600 possessing a first positive input 602 connected to the output 306 of the first adder 300, a second positive input 604 connected to the output 558 of the second adder 550 and an output 606 delivering the signal $0.5 \cos(9\omega_0 t + 5\phi) + 0.5 \cos(\omega_0 t + 5\phi)$;

a low-pass filter 700 set to the pulsatance of the first alternating voltage VEX or of the second alternating voltage VEY and possessing an input 702 connected to the output 606 of the sixth multiplier 600 and an output 704 able to deliver a signal representing the phase variation, amplified by a factor n, defined between the first VEX and second VEY alternating voltages (here $0.5 \cos(\omega_0 t + 5\phi)$ with n=5).

Those skilled in the art will appreciate that at the end of the amplifying chain the time-origin phase of the output signal is multiplied by 5.

In practice, the multipliers are multipliers of the 4-quadrant type, for example those sold by the company ANALOG DEVICE under reference AD734.

The first and second adders are constructed from operational amplifiers.

The gain of an input of an adders is obtained through the ratio of the ohmic values of the resistors located upstream of the adder.

For example, the frequency $F_0 (\omega_0 = 2\pi F_0)$ of the first or second alternating voltage VEX or VEY is equal to 6.78 MHz, and its voltage is of the order of 2 V. Here the phase amplification is by 5 insofar as the AD734 multipliers do not support a frequency greater than 43 MHz.

Quite obviously, with other components it is possible to obtain a greater phase gain.

The low-pass filter 700 is for example a filter of the Butterworth or Tchebyscheff type.

Figure 7:
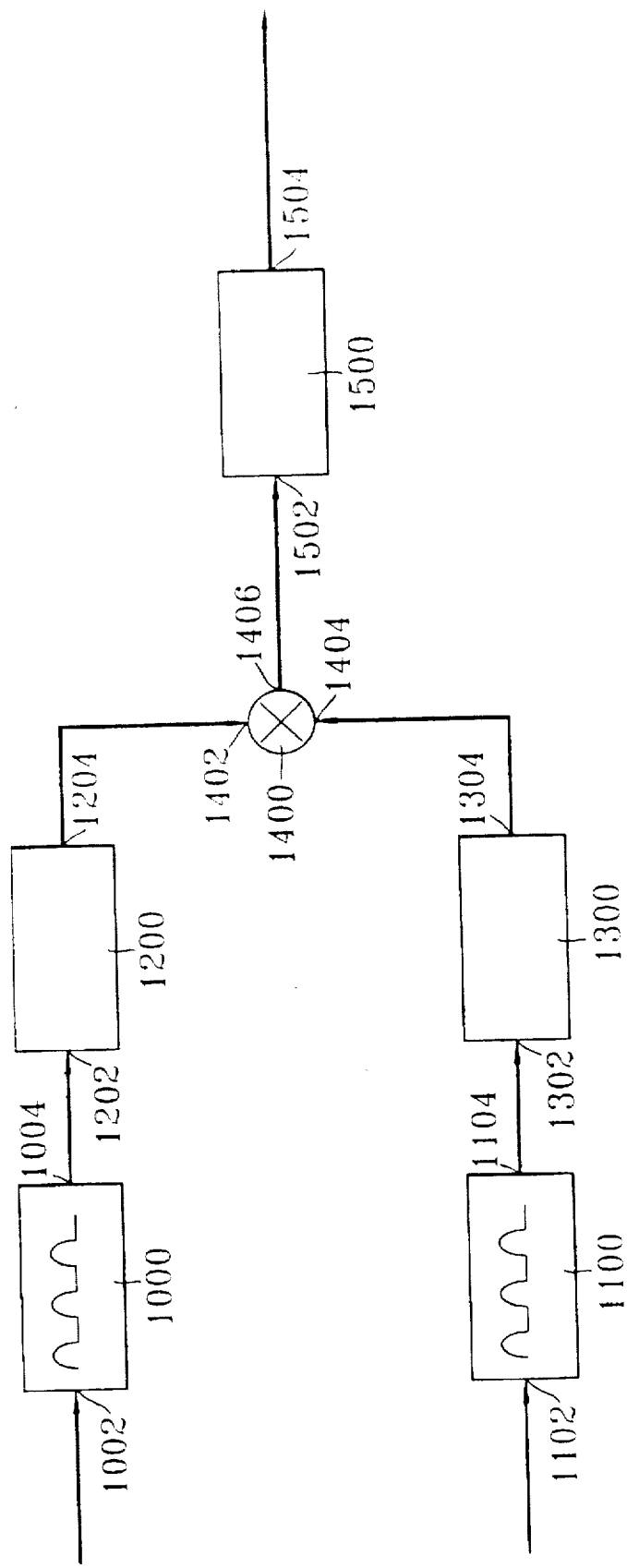
FIG. 7 represents diagrammatically the essential elements constituting the phase amplifying means with spectral law according to the invention.

In FIG. 7 is represented the embodiment of the phase amplifying means which follow a spectral law.

Generally, the spectral law consists here in obtaining harmonics of the two input signals VEX and VEY and of then choosing the harmonic of order n for the VEY channel and n−1 for the VEX channel. Finally, it is convenient to multiply these two channels to obtain an output signal whose phase is amplified by a coefficient n after filtering out the unwanted signals.

More precisely, the phase amplifying means follow a spectral law comprising:

a first rectifier circuit 1000 able to distort the first alternating voltage VEX, corresponding to the signal $\sin(\omega_0 t)$, into a first half-wave signal, and possessing an input 1002 connected to the first lug B10 and an output 1004 delivering the signal:

$$A_0 + \Sigma[(a_n \cos(n\omega_0 t) + b_n \sin(n\omega_0 t)]$$

a second rectifier circuit 1100 able to distort the second alternating voltage VEY corresponding to the signal $\sin(\omega_0 t + \phi)$ into a second half-wave signal, and possessing an input 1102 connected to the second lug B20 and an output 1104 delivering the signal:

$$B_0 + \Sigma[(c_k \cos(k\omega_0 t + k\phi)) + d_k \sin(k\omega_0 t + k\phi)]$$

a first bandpass filter 1200 able to allow through a frequency range centered on a multiple n−1 of the frequency of the first alternating voltage VEX and possessing an input 1202 connected to the output 1004 of the first distortion circuit, and an output 1204 delivering the signal:

$$E_n \sin(4\omega_0 t + \phi_n)$$

a second bandpass filter 1300 able to allow through a frequency range centered on a multiple n of the frequency of the second alternating voltage VEY and possessing an input 1302 connected to the output 1104 of the second distortion circuit 1100 and an output 1304 delivering the signal:

$$F_k \sin(5\omega_0 t + 5\phi + \phi_k)$$

a multiplier 1400 possessing a first input 1402 connected to the output 1204 of the first bandpass filter 1200, a second input 1404 connected to the output 1304 of the second bandpass filter 1300 and an output 1406 delivering the signal:

$$G \sin(9\omega_0 t + 5\phi + \theta_1) + B \sin(\omega_0 t + 5\theta + \phi_2)$$

a low-pass filter 1500 set to the frequency of the first alternating voltage VEX or of the second alternating voltage VEY and possessing an input 1502 connected to the output 1406 of the multiplier 1400 and an output 1504 able to deliver a signal representing the phase variation, amplified by a factor n (here $B \sin(\omega_0 t + 5\theta + \phi_2)$ with n=5, between the first and second alternating voltages.

The integer n is here equal to 4, namely an amplifying factor of 5, which may be regarded as sufficient to improve the signal-to-noise ratio.

In practice, the multiplier is of the 4-quadrant type, for example that sold by the company ANALOG DEVICE under reference AD734.

The rectifier circuits are for example constituted by a resistor-diode setup with a resistance of the order of 50 ohms and a straightforward diode such as that sold under reference DIN4148.

The bandpass filters are for example of the Butterworth or Tchebyscheff type.

The phases $\phi_n, \phi_1, \phi_2$ and $\phi_k$ are neglectable phases insofar as they are constant and imposed by the engineering of the circuits.

The parameters $A_0, a_n, b_n, B_0, c_k, d_k, E_n, F_k, G$ and B are used here to analyze the useful signals by a mathematical method which is well known to those skilled in the art by the name of Fourier transform. They are not directly involved in obtaining the amplification by a factor n of the phase variation between the voltages VEX and VEY.

It should be noted that the solution following the spectral law uses fewer components than that following the trigonometric law. This makes it cheaper and easier to produce.

I claim:

1. A system for remote information exchange between a portable object and a station, the system comprising:

at the station:

an alternating voltage generator (G) able to deliver a first, chosen, fixed, not modulated, substantially pure voltage (VEX), a station-resistive element (RC) possessing a first lug (B10) connected to the voltage generator (G) and a second lug (B20), a series arrangement of low impedance connected to the second lug (B20) and possessing a station-inductive element (L1) and a station-capacitive element (C1), said arrangement being capable of producing a second fixed alternating voltage (VEY), the phase difference between the first and second alternating voltages being variable solely at the station, and station-processing means (SPM) connected to the first (B10) and second (B20) lugs and capable of processing the phase variations between the first (VEX) and second (VEY) voltages;

at the portable object (10):

an electronic circuit (3) switchable between an inactive state and an active state in which it forms a resonant circuit with the station-inductive element (L1) and induces in the latter an additional resistive term (DR1), and object-processing means (OPM) capable of switching the electronic circuit (3) as a function of information to be transmitted to the station, said transmitted information between the portable object and the station having a single spectrum line;

wherein the phase variation (Do) between the first (VEX) and second (VEY) voltages, which is induced solely at the station by switchings, enable the station-processing means (SPM) to deduce said information therefrom, and wherein elements of the electronic circuit (3) and of the station (R1, C1, L1, RC) are chosen and configured so that a phase variation (Do) induced by an inductive coupling is greater than a predetermined threshold.

2. The system as claimed in claim 1, wherein the station-processing means (SPM) comprise:

a first matching circuit (MC1) able to convert the first alternating voltage (VEX) into a first square signal (VTTLX) and possessing a first input connected to the first lug (B10), a second input receiving a first reference voltage (K1) and an output, a second matching circuit (MC2) able to convert the second alternating voltage (VEY) into a second square signal (VTTLY) and possessing a first input connected to the second lug (B20), a second input receiving a second reference voltage (K2) and an output, a logic assembly (LA) possessing a first input connected to the output of the first matching circuit (MC1), a second input connected to the output of the second matching circuit (MC2), and an output able to deliver the binary information (SS) induced by the phase variations between the first and second alternating voltages thus converted.

3. The system as claimed in claim 2, wherein the first matching circuit (MC1) comprises:

a first non-inverting operational amplifier (AP1) possessing a first input (102) connected to the first lug (B10), a second input (103) receiving the first reference voltage (K1) across a first resistor (110), and an output (105).

a first switching circuit (TG1) possessing an input (130) connected to the output (105) of the first amplifier (AP1) and an output (140) able to deliver a first trigger signal.

4. The system as claimed in claim 2, wherein the second matching circuit (MC2) comprises:

a second non-inverting operational amplifier (AP2) possessing a first input (202) connected to the second lug (B20), a second input (203) receiving the second reference voltage (K2) across a first resistor (210) and an output (205), and a second switching circuit (TG2) possessing an input (230) connected to the output (205) of the second amplifier (AP2) and an output (240) able to deliver a second trigger signal.

5. The device as claimed in any of claims 2 to 4, wherein the logic assembly (LA) comprises:

a flip-flop (D) possessing a first input (302) connected to the output of the first switching circuit (TG1), a second input (304) connected to the output of the second switching circuit (TG2) and an output, and integration means (INT) possessing an input connected to the output of the flip-flop (D) and an output (S) delivering the information thus transmitted.

6. The system as claimed in claim 1, wherein the ratio of the value of the additional resistive term (DR1) to the resistive value of the station-inductive element (L1) is greater than a chosen value.

7. The system as claimed in claim 1, wherein the station comprises an inductive portal forming the station-inductive element.

8. The system as claimed in claim 1, wherein the portable object is of the card, badge, memory card or similar type.

9. The system as claimed in claim 1, wherein the station-processing means further comprises phase amplifying means to amplify the phase variation (Dφ) between the first (VEX) and second (VEY) voltages before it is processed.

10. The system as claimed in claim 9, wherein the phase amplifying means comprise:

a first rectifier circuit (1000) able to distort the first alternating voltage (VEX) into a first half-wave signal, and possessing an input (1002) connected to the first lug (B10) and an output (1004);

a second rectifier circuit (1100) able to distort the second alternating voltage (VEY) into a second half-wave signal, and possessing an input (1102) connected to the second lug (B20) and an output (1104);

a first bandpass filter (1200) able to allow through a frequency range centered on a multiple n−1 of the frequency of the first alternating voltage (VEX) and possessing an input (1202) connected to the output (1004) of the first distortion circuit (1000) and an output (1204);

a second bandpass filter (1300) able to allow through a frequency range centered on a multiple n of the frequency of the second alternating voltage (VEY) and possessing an input (1302) connected to the output (1104) of the second distortion circuit (1100) and an output (1304);

a multiplier (1400) possessing a first input (1402) connected to the output (1204) of the first bandpass filter (1200), a second input (1404) connected to the output (1304) of the second bandpass filter (1300) and an output (1406);

a low-pass filter (1500) set to the frequency of the first alternating voltage (VEX) and possessing an input (1502) connected to the output (1406) of the multiplier (1400) and an output (1504) able to deliver a signal representing the phase variation, amplified by a factor n, between the first (VEX) and second (VEY) voltages.

11. The system as claimed in claim 10, wherein n is equal to five.

12. The system as claimed in claim 9, wherein the phase amplifying means comprise:

a first multiplier (100) possessing a positive input (102) connected to the first lug (B10), a negative input (104) connected to the first lug (B10) and an output (106);

a second multiplier (200) possessing a positive input (202) connected to the output (106) of the first multiplier (100), a negative input (204) connected to the output (106) of the first multiplier (100) and an output (206);

a first adder (300) possessing a first input (302), having a chosen gain, connected to the output of the second multiplier, a second input (304), having a chosen gain, connected to the output (106) of the first multiplier (100) and an output (300) able to deliver a signal representing a multiple n−1 of the frequency of the first alternating voltage (VEX);

a third multiplier (350) possessing a first positive input (352) connected to the second lug (B20), a second positive input connected to the second lug (B20) and an output;

a fourth multiplier (400) possessing a positive input (402) connected to the output (356) of the third multiplier (350), a negative input (404) connected to the second lug (B20), and an output (406);

a fifth multiplier (500) possessing a positive input (502) connected to the output (406) of the fourth multiplier (400), a negative input (504) connected to the output (356) of the third multiplier (350) and an output (506);

a second adder (550) possessing a first input (552), having a chosen gain, connected to the output (506) of the fifth multiplier (500), a second input (354), having a chosen gain, connected to the output (406) of the fourth multiplier (400), a third input (556), having a chosen gain, connected to the second lug (B20) and an output (358) able to deliver a signal representing a multiple n of the frequency of the second alternating voltage (VEY);

a sixth multiplier (600) possessing a first positive input (602) connected to the output (306) of the first adder (300), a second positive input (604) connected to the output (558) of the second adder (550) and an output (606);

a low-pass filter (700) set to the frequency of the first alternating voltage (VEX) and possessing an input (702) connected to the output (606) of the sixth multiplier (600) and an output (704) able to deliver a signal representing the phase variation, amplified by a factor n, between the first (VEX) and second (VEY) alternating voltages.

13. An installation, comprising a plurality of systems for remote information exchange between a portable object and a station, wherein each system comprises:

at the station:

an alternating voltage generator (G) able to deliver a first, chosen, fixed, not modulated substantially pure voltage (VEX), a station-resistive element (RC) possessing a first lug (B10) connected to the voltage generator (G) and a second lug (B20), a series arrangement of low impedance connected to the second lug (B20) and possessing a station-inductive element (L1) and a station-capacitive element (C10), said arrangement being capable of producing a second alternating voltage (VEY), the phase difference between the first and second alternating voltages being variable at the station, and station-processing means (SPM) connected to the first (B10) and second (B20) lugs and capable of processing the phase variations between the first (VEX) and second (VEY) voltages;

at the portable object (10):

an electronic circuit (3) switchable between an inactive state and an active state in which it forms a resonant circuit with the station-inductive element (L1) and induces in the latter an additional resistive term (DR1), and object-processing means (OPM) capable of switching the electronic circuit (3) as a function of information to be transmitted to the station, said transmitted information between the portable object and the station having a single spectrum line;

wherein the phase variation (D$\phi$) between the first (VEX) and second (VEY) voltages, which is induced solely at the station by switchings, enable the station-processing means (SPM) to deduce said information therefrom, and wherein elements of the electronic circuit (#) and of the station (R1, C1, L1, RC) are chosen and configured so that a phase variation (D$\phi$) induced by an inductive coupling is greater than a predetermined threshold.

* * * * *